(No Model.) 2 Sheets—Sheet 2.
M. JOO.
COMBINATION ARTICLE OF FURNITURE.
No. 581,233. Patented Apr. 20, 1897.

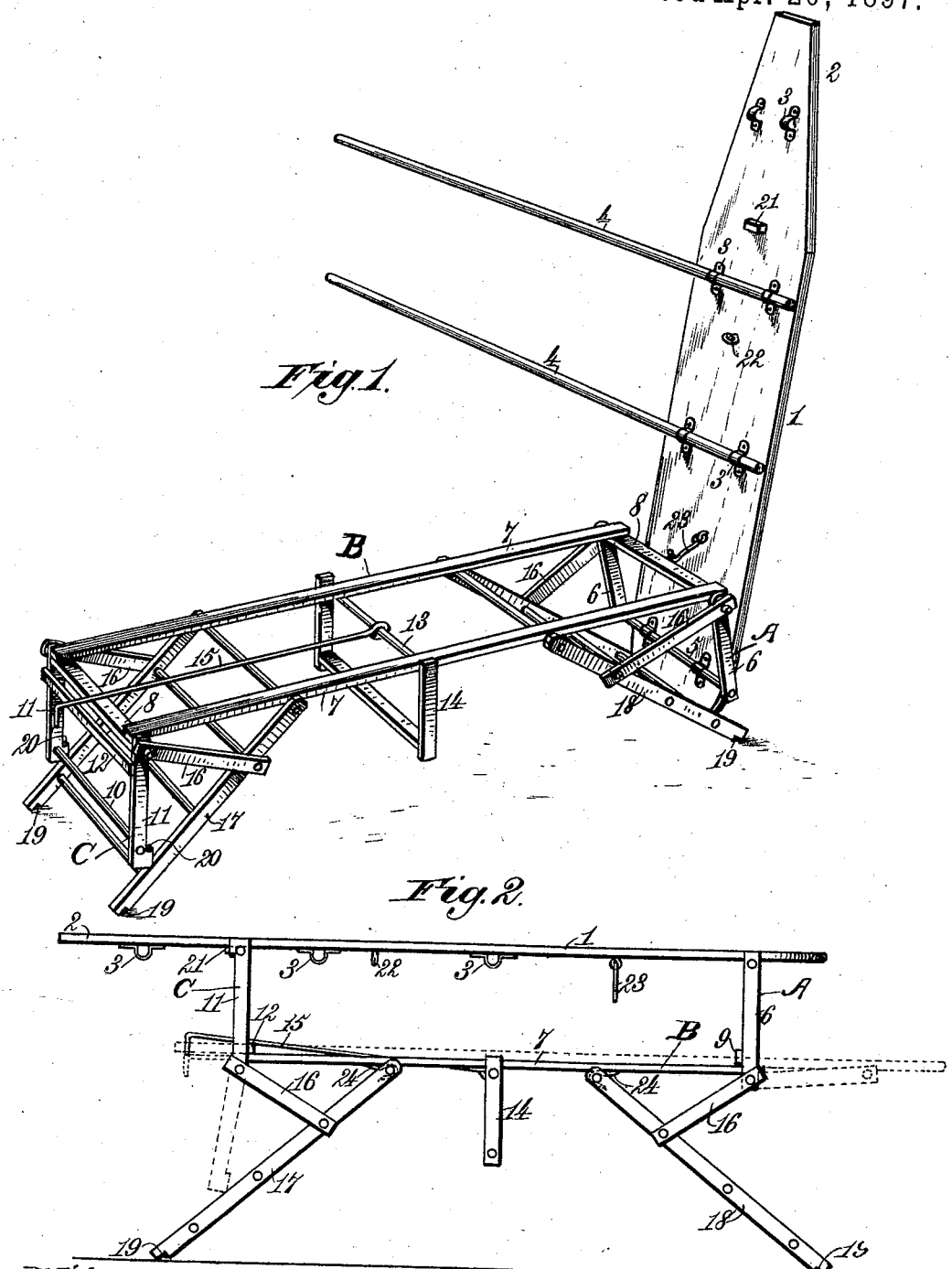

Witnesses.
Lucy B. Hills.
Geo. M. Copenhaver.

Inventor.
Morris Joo
by Franck D. Johns
Atty

UNITED STATES PATENT OFFICE.

MORRIS JOO, OF NEWPORT NEWS, VIRGINIA.

COMBINATION ARTICLE OF FURNITURE.

SPECIFICATION forming part of Letters Patent No. 581,233, dated April 20, 1897.

Application filed June 8, 1896. Serial No. 594,758. (No model.)

*To all whom it may concern:*

Be it known that I, MORRIS JOO, a citizen of the United States, residing at Newport News, in the county of Warwick and State of Virginia, have invented certain new and useful Improvements in a Combination Article of Furniture; and I do hereby declare the following to be a full, clear, and exact description of the invention, such as will enable others skilled in the art to which it appertains to make and use the same.

My invention relates to devices combining in their structure a number of different articles of household furniture, and has for its particular object to provide an improved construction of combined washbench, ironing-board, bosom-board, clothes-rack, settee, and step-ladder, all so arranged in one structure that the same may be readily adjusted to any one of these articles or may be folded into a compact form for transportation. This I accomplish in the manner and by the means hereinafter described and claimed, reference being had to the accompanying drawings, in which—

Figure 3:
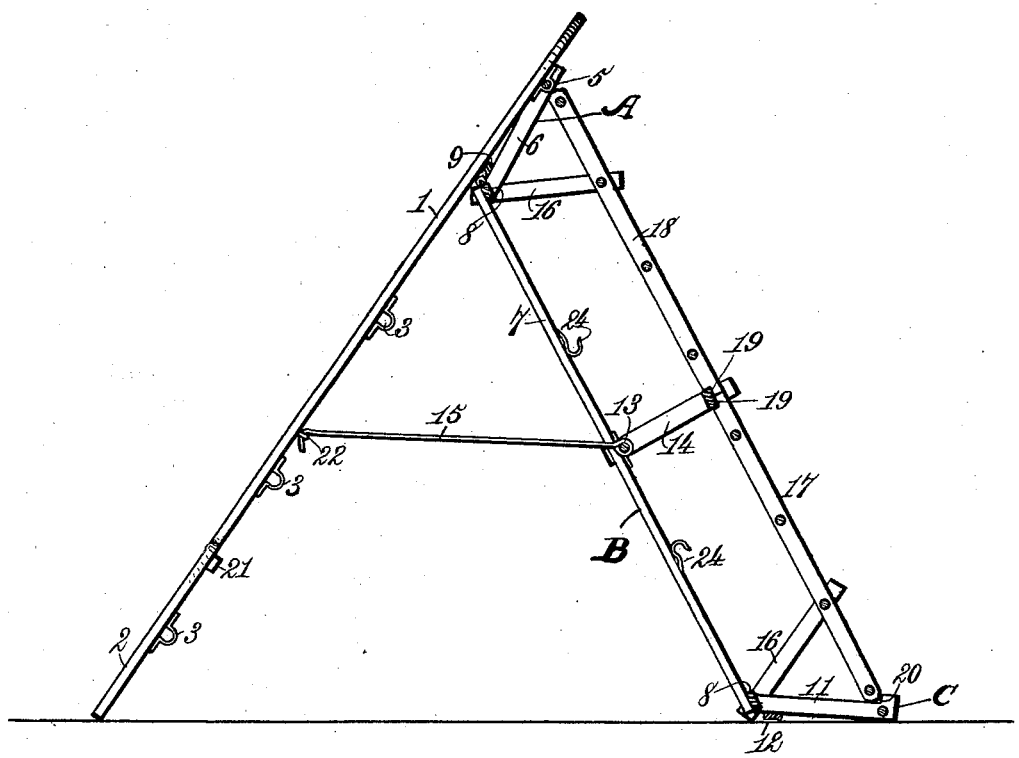
Figure 4:
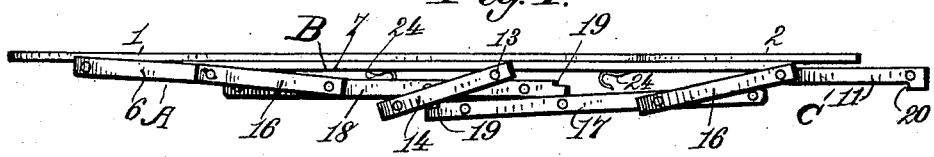

Figure 1 is a perspective view of my improved device, the same being shown adjusted for use as a washbench with a clothes-rack attachment. Fig. 2 is a side elevation of the same adjusted for use as an ironing and bosom board, its adjustment as a settee being shown therein in dotted lines. Fig. 3 is a similar view showing the same adjusted as a step-ladder, and Fig. 4 is a similar view showing the device in its folded position ready for transportation.

Similar letters and numerals of reference denote corresponding parts in the several views.

In the said drawings the reference-numeral 1 denotes an ironing-board, tapered at one end into a bosom-board 2, as shown in Fig. 1. The under side of said board is provided with a series of sockets 3, adapted to detachably receive therein the poles 4 to be used as drying-racks. Said ironing-board is pivoted near its end, opposite to the bosom-board 2, to a cross-bar 5, carried by the arms 6, said bar and arms forming a yoke A and being pivoted to one end of a frame B, consisting of the longitudinal bars 7 and the cross-strips 8, said frame being somewhat shorter than the ironing-board 1. This yoke A is also provided with a fixed cross-piece 9 near its point of attachment to the frame B. Said frame has pivoted to its other end a similar yoke C, formed by the cross-bar 10 and arms 11 and having a similar cross-piece 12. Pivoted upon a cross-bar 13, mounted centrally upon the under side of the longitudinal bars 7, is a yoke 14, for a purpose hereinafter to be described. This cross-bar 13 has also pivoted centrally thereon a hook 15, the same being preferably a little longer than one-half the length of the longitudinal bars 7, as shown in Fig. 1.

Pivoted upon the same points as the end yokes above described are the bars 16, the same being pivoted at their other ends to the two sections 17 and 18 of a ladder, the latter being provided with preferably four rounds each and having their pivotal connections with said bars 16 coincident with the second round from one end, as shown. These ladder-sections are notched or recessed at 19 on their ends farthest from said pivotal points. The free ends of the arms 11 of one of the yokes are also recessed at 20, all for a purpose hereinafter described. The under side of the ironing-board is also provided with a stop-block 21, an eye 22, and a hook 23, while the longitudinal bars 7 are provided intermediate their length with the hooks 24, also for a purpose hereinafter described.

Referring now to Fig. 1, it will be seen that by swinging the ironing-board 1 upon the yoke A, connecting it with the frame B, to the position shown in said figure and then connecting the hook 23 with an eye in one of the cross-strips 8 and by engaging the end rounds of the two ladder-sections 17 18 with the hooks 24 on the under sides of the longitudinal bars 7 the whole device will be held firmly in said position, supported upon said ladder-sections as feet. This support is shown more particularly in Fig. 2, where it will be seen that the hooks 24 effectually prevent any movement of the ladder-sections toward each other, the bars 16 at the same time acting as braces. In this adjustment the lower end of the ironing-board 1 impinges against the lower round of the ladder-section 18, thus holding said board in its position slightly inclined from the vertical. The device is now in position for use as a washbench, the tub or tubs to be supported upon the frame B, while the horizontal poles 4, inserted in the sockets 3, will serve as convenient racks for the reception of the washed articles. There may be any desired number of these poles, and they may be located as shown in Fig. 1, or they may be slid through their sockets, so as to project from the other side of the ironing-board.

To convert the article into an ironing-table, it is only necessary to detach hook 23 from its eye and to swing the board 1 upon its yoke A to the position shown in Fig. 2, care being taken to first swing the yoke C to its uppermost position, as shown, and to bring the free end of the board down thereupon, so that the cross-bar 10 of said yoke will engage behind stop-block 21 on the under side of said board, the said yoke thus affording a firm support for the free end of said board. The yokes A and C are prevented from any further pivotal movement toward each other by reason of the engagement of their cross-pieces 9 and 12 with the longitudinal bars 7. The tapered end 2 of the ironing-board by projecting some distance beyond the supporting-yoke C affords a convenient bosom-board for shirts. Moreover, a shirt may be firmly held thereon while ironing by engaging a portion of the same between the said yoke C and the under side of the board, as will be readily understood.

When the device is converted from a washbench to an ironing-board and it is desired to iron any large articles, such as sheets, by leaving the central pole 4 attached to said board a convenient means for supporting the sheet to be ironed is afforded, as the latter will be supported by said pole clear of the floor, or, if desired, two or more of said poles may be left in position, which will afford an even better support for the article.

I have also shown in dotted lines in Fig. 2 the position of the device when converted into a bench or settee, which is done by disengaging and swinging down the yoke C and rocking the board on the yoke A until the device assumes the position shown in said dotted lines.

Now to convert the device into a step-ladder it is only necessary to change the positions of the board 1 and frame B to the position shown in Fig. 3 and to engage the hook 15 with the eye 22 in the under side of the board 1, which will effectually prevent any movement of said board and frame either toward or away from each other. Now by swinging the ladder-sections 17 and 18 upon their pivots until the end of section 17 nearest its pivotal point engages with the recess 20 in yoke C and the notches 19 in its other ends engage with the cross-bar of central yoke 14 and in a similar manner swinging section 18 until its notched ends 19 also engage with said cross-bar of the yoke 14 and its other end impinges against yoke A the device will be ready for use as a step-ladder.

The device may be "knocked down" ready for transportation, as shown in Fig. 4, by folding the various parts in the manner shown, as will be readily understood.

Having thus described my invention, what I claim as new, and desire to secure by Letters Patent, is—

1. An article of furniture, consisting of a frame adapted to support a washtub, and means for supporting said frame, in combination with a board having sockets thereon adapted to receive a series of poles, a yoke pivotally connecting said board to the frame at one end, and detachable means for retaining said board in a substantially vertical position with respect to said frame, substantially as described.

2. In an article of furniture, the combination with a frame, an ironing-board, and means for adjustably connecting the two together, of a support for said frame consisting of two ladder-sections pivotally connected intermediate their lengths to the ends of said frame through intermediate bars and adapted when inclined toward each other to engage at their upper ends with hooks fixed to the under side of said frame, substantially as described.

3. In an article of furniture, the combination with an ironing-board, a frame, a yoke pivotally connecting one end of said board with one end of said frame, and a hook for connecting said board and frame intermediate their length to retain them against movement with respect to each other when in an inverted-V position with their lower ends resting on the floor, of two ladder-sections pivoted their intermediate lengths to the ends of said frame, and means carried by the frame for supporting said ladder-sections in line with each other and parallel with said frame, substantially as described.

4. In an article of furniture, the combination with an ironing-board, a frame, a yoke pivotally connecting one end of said board with one end of said frame, and a hook for connecting said board and frame intermediate their length to retain them against movement with respect to each other when in an inverted-V position with their lower ends resting on the floor, of a recessed yoke pivoted to the lower end of said frame and adapted to rest upon the floor, a yoke pivoted centrally to said frame, and two ladder-sections pivoted intermediate their lengths to the ends of said frame through connecting-bars, the lower ladder-section adapted to rest at its lower end in the recesses of the lower yoke and at its upper notched end upon the intermediate yoke and parallel with the frame, and the upper ladder-section adapted to rest at its upper end against the upper yoke and at its lower notched end upon the intermediate yoke and parallel with the frame and in line with the lower yoke, substantially as described.

In testimony whereof I affix my signature in presence of two witnesses.

MORRIS JOO.

Witnesses:
W. M. TAYLOR, Jr.,
C. G. NELMS.